Figure 1:
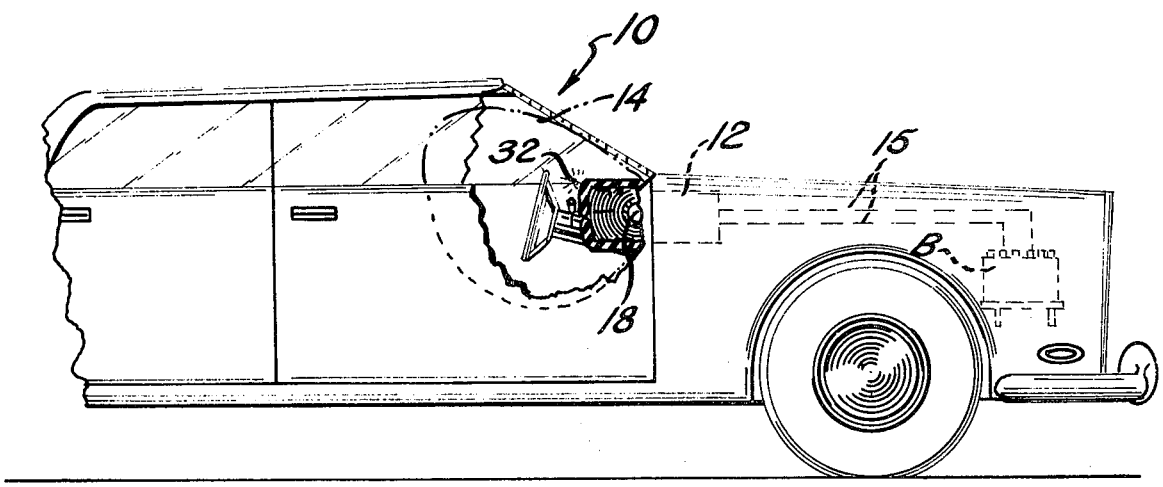

United States Patent [19]

Tuttle

[11] 3,916,376

[45] Oct. 28, 1975

[54] ACTUATING AND MONITORING DEVICE FOR INFLATABLE OCCUPANT RESTRAINT SYSTEM

[75] Inventor: Miles L. Tuttle, Northville, Mich.

[73] Assignee: Eaton Corporation, Cleveland, Ohio

[22] Filed: Nov. 17, 1972

[21] Appl. No.: 307,465

[52] U.S. Cl. .............. 340/52 H; 180/103; 340/262
[51] Int. Cl.² ................. G08B 21/00; B60R 21/08
[58] Field of Search ........ 340/52 H, 61, 262, 248 B; 307/10 R; 280/150 AB; 180/103, 91; 320/1

[56] References Cited
UNITED STATES PATENTS

| | | | |
|---|---|---|---|
| 3,193,748 | 7/1965 | Langan | 320/1 |
| 3,366,848 | 1/1968 | Luehring et al. | 340/248 B |
| 3,601,655 | 8/1971 | Andersen | 340/262 |
| 3,629,816 | 12/1971 | Gillund | 180/103 |
| 3,714,627 | 1/1973 | Dillman et al. | 340/52 H |

Primary Examiner—John W. Caldwell
Assistant Examiner—Joseph E. Nowicki
Attorney, Agent, or Firm—Ieagno & Toddy

[57] ABSTRACT

A safety system is provided for a vehicle having a battery, an ignition switch connected to the battery and a safety device actuated by an electrically energizable actuator. An electrical circuit is connected to the battery through the ignition switch for purposes of energizing the actuator upon closure of a crash sensor switch. A redundant power supply circuit, including a capacitor which is charged by current derived from the battery through the ignition switch, serves to energize the actuator only when the sensor switch is closed and the battery voltage is less than the voltage stored by the capacitor. A monitoring circuit continuously monitors the battery derived voltage applied to the sensor switch and energizes a failure indicator when the magnitude of the voltage decreases to a magnitude less than a predetermined magnitude.

9 Claims, 2 Drawing Figures

ACTUATING AND MONITORING DEVICE FOR INFLATABLE OCCUPANT RESTRAINT SYSTEM

This invention relates to the art of vehicle safety systems of the passive type in which a vehicle safety device is actuated by a crash sensor and, more particularly, to improvements in circuitry for actuating the safety device and monitoring the operation of the circuitry.

A vehicle safety system of the type which the present invention may be applied is shown in the U.S. Pat. No. to S. Oldberg et al 3,414,292, assigned to the same assignee as the present invention. That safety system employs an inflatable confinement which is inflated to restrain movement of a vehicle occupant during a collision. The confinement is inflated when a crash sensor switch detects a vehicle deceleration of a predetermined magnitude. To accomplish this, the sensor switch closes to complete an electrical circuit to energize a safety device actuator, such as a detonator coil, which in turn serves to cause the confinement to be inflated to its expanded condition.

Actuation of the safety device depends upon an electrical impulse being applied to the actuator in response to closure of the sensor switch to initiate inflation of the confinement. Normally, the necessary electrical energy is supplied as current from the main automobile battery through the crash sensor switch. Consequently, the condition of the battery prior to and during a crash is of prime concern. Thus, if prior to a crash condition the battery voltage becomes abnormally low the available voltage may be inadequate to properly energize the actuator. It is therefore desirable to provide the vehicle operator with a failure warning indication of such a condition. During a crash condition, the battery may fail by being crushed or the battery cables may be shorted or broken. In such event, the system may not provide sufficient operating voltage to energize the actuator. Consequently, it is desirable that such a safety system incorporate a secondary power supply which should be redundant to the main battery and be isolated therefrom so that a failure in one supply would not affect the output of the other supply.

It is, therefore, an object of the present invention to provide an improved vehicle safety system employing a secondary power supply which is redundant from the main battery and is isolated therefrom so that failure of one supply does not affect the output of the other supply.

It is a still further object of the present invention to provide means for continuously monitoring the power supply and provide a warning indication to a vehicle operator upon a system malfunction, such as low battery voltage.

It is a still further object of the present invention to provide means for periodically checking the operability of the malfunction warning indicator.

The present invention contemplates that a vehicle be provided with a battery, an ignition switch connected to the battery, and a safety device actuated by an electrically operated actuator.

In accordance with one aspect of the present invention, the secondary power supply circuit employs a capacitor which is charged by applying current thereto from the battery through the ignition switch. The capacitor is connected with a sensor switch in such a manner that the capacitor will discharge through the sensor switch to energize the actuator only when the sensor switch is closed and the battery voltage is less than the voltage stored by the capacitor. A monitor continuously monitors the circuitry and serves to energize a warning indicator when the battery voltage decays below a predetermined magnitude.

In accordance with another aspect of the present invention, the sensor switch completes a series circuit with the actuator and a power supply circuit connected with the ignition switch serves to provide primary battery supplied voltage across the series circuit of a magnitude normally at least greater than a desired magnitude sufficient to energize the actuator when the sensor switch is closed. The power supply circuit also employs a capacitor and circuitry for applying charging current derived from the battery to the capacitor so that it charges to a voltage which is normally less than the magnitude of the primary voltage, but still sufficient to energize the actuator. A discharge circuit is defined including the series circuit and is connected to the capacitor in such a manner that the capacitor will discharge through the series circuit only when the sensor switch is closed and the primary voltage is less than the stored voltage. A control circuit serves to continuously monitor a portion of the discharge circuit including at least the actuator and energizes an indicator whenever the magnitude of the voltage across the monitored portion is less than the desired magnitude for energizing the actuator.

Still further in accordance with a more limited aspect of the present invention, the indicator comprises a lamp and test circuitry is provided for testing the operability of the lamp.

Still further in accordance with the invention, a connector mechanism serves to connect the actuator with the sensor switch to complete the series circuit. A connector condition indicating switch is placed in a closed condition to represent that the connector is not properly connected for completing this series circuit. This energizes the indicator to provide a warning indication to the vehicle operator that the actuator is not properly connected.

Figure 2:
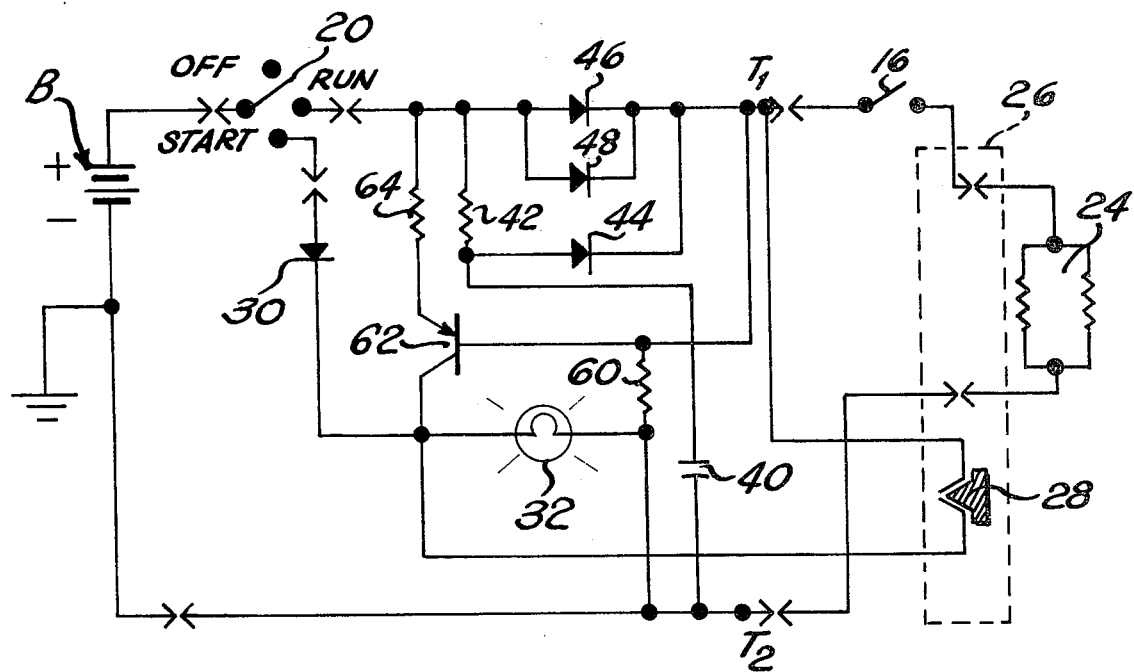

The foregoing and other objects and advantages of the invention will become more readily apparent from the following description of the preferred embodiment of the invention as taken in conjunction with the accompanying drawings which are a part hereof and wherein:

FIG. 1 is a schematic illustration showing a vehicle safety system to which the present invention may be applied; and, FIG. 2 is a schematic illustration of the circuitry in accordance with the present invention for use in the system of FIG. 1.

The present invention provides an improved vehicle safety system of the type which employs a safety device which is operated by an electrically energized actuator upon closure of a crash sensor switch. In accordance with the present invention, an electrical impulse for energizing the actuator is derived from a vehicle battery or from a redundant power supply in the event the battery voltage is lost, as during a crash condition. The circuitry is continuously monitored and a failure indication is provided in the event that the battery voltage decays below a desired magnitude.

Referring now to the drawings wherein the showings are for purposes of illustrating the preferred embodiment of the invention only, and not for purposes of limiting same, FIG. 1 schematically illustrates an automotive vehicle 10 which employs a vehicle safety system 12. The safety system includes a confinement 14 which is inflated, from a collapsed condition shown in solid lines in FIG. 1, to an expanded condition shown in dashed lines in FIG. 1, for purposes of restraining movement of an occupant in the vehicle during a collision. Expansion of the confinement is initiated upon energization of an actuator coil. The vehicle employs a battery B which serves as the primary source of electrical energy for operating the actuator coil upon closure of a crash sensor switch. The battery is connected to the safety system 12 by means of suitable battery cables 15. The crash sensor switch is suitably mounted, as to the fire wall of the vehicle, and becomes closed upon a predetermined vehicle deceleration to complete a series circuit with the actuator coil.

The safety system 12 may take various forms and for example may include structure similar to that as shown in the aforesaid U.S. Pat. No. 3,414,292. Thus, the system employs a fluid supply in the form of a reservoir 18 containing fluid under pressure. A detonator or actuator coil is associated with reservoir 18 and serves when electrically operated to effect activation of an explosive charge to cause the confinement 14 to be inflated.

Reference is now made to FIG. 2 which schematically illustrates the circuitry employed in the improved safety system of the present invention. The vehicle's battery B has its negative terminal connected to ground and its positive terminal connected to the movable element of a three position vehicle ignition switch 20. As is conventional, the ignition switch has an off position, a start position for starting the vehicle and a run position for a normal vehicle operation. With switch 20 in its run position, a power supply circuit is completed from the battery B to a pair of output terminals $T_1$ and $T_2$. Operating voltage is normally provided across these terminals of sufficient magnitude for energizing the detonator firing circuit. The firing circuit is a series circuit including the normally open crash sensor switch 16 and the actuator 24. A connector 26 is employed for purposes of connecting the actuator 24 with the sensor switch 16 to complete the series circuit. Once a proper connection has been made, a normally closed switch 28 is opened.

Each time a vehicle equipped with the safety system is started, switch 20 is positioned in its start position. This completes a circuit across the battery so that current will flow through a diode 30, poled as shown, and a failure warning lamp 32. This provides a test operation each time the vehicle is started to inform the operator as to whether the warning indicator 32 is operative. Also, once the ignition is placed in its run position, a circuit is completed from output terminal $T_1$ through normally closed switch 28 and the indicator lamp 32 across the battery B. If switch 28 is closed, representative that the connector is not properly connecting actuator 24 to the sensor switch 16, a circuit is completed to energize the failure warning lamp 32, thereby providing the vehicle operator with an indication that the safety system is not armed.

With the connector 26 being properly connected, a series circuit is completed comprised of sensor switch 16 and actuator 24 across terminals $T_1$ and $T_2$. It is important that the operating voltage across the terminals be sufficient so that upon closure of switch 16 there will be provided at least a short impulse of current through the series circuit of sufficient magnitude to electrically operate the actuator and cause the confinement 14 to be expanded from its collapsed condition to its expanded condition. Normally, the energizing impulse is provided by the battery B and, hence, the condition of the battery during a crash condition is of prime concern. If the battery fails during a crash, due to crushed battery plates, or the battery cables 15 are broken, there may be insufficient operating voltage across output terminals $T_1$ and $T_2$ to electrically operate the actuator 24. It is for this reason that the improved safety system employs a secondary power source to provide sufficient operating voltage across output terminals $T_1$ and $T_2$ in the event the battery voltage should fail. This secondary source is redundant to battery B and is isolated therefrom such that a failure of the battery will not affect the output of the secondary supply.

The secondary power supply employs a capacitor 40 which is preferably located at a remote location from that of battery B. When the ignition switch 20 is placed in its run position, the capacitor 40 is charged by battery current flowing through the ignition switch and a current limiting resistor 42. Resistor 42 is of sufficient magnitude to limit the charging current to an acceptable level to protect the capacitor and also compensate for capacitor leakage by supplying a continuous trickle charging current. The charging circuit is sufficient that the voltage stored by the capacitor 40, while somewhat less than that normally supplied by battery B, is sufficient to provide the necessary operating voltage for the series circuit to operate the actuator 24.

A diode 44, poled as shown, connects the junction of capacitor 40 and resistor 42 with the output terminal $T_1$. Consequently, so long as the battery voltage at terminal $T_1$ is greater than the voltage stored by capacitor 40, the diode 44 is reverse biased to prevent discharge of capacitor 40 through the series circuit. Protective diodes 46 and 48 prevent capacitor 40 from discharging in the direction of battery B in the event that there is a short circuit across the battery of connections thereto. Consequently, diodes 46 and 48 protect the output from the capacitor against a short circuit in the main power supply and diode 44 protects the output of the main battery supply against a short across the capacitor 40. The failure of either the battery B or capacitor 40 will be covered by the other voltage source since both sources are isolated from each other and each serves to supply sufficient energy to electrically operate actuator 24.

Attention is now directed to the various redundancies offered by the two supply sources in the vehicle safety system. If a failure occurs in the main battery B the redundant capacitor 40 will supply sufficient energy to operate actuator 24. If, however, a failure occurs in the secondary source due to an open or short circuit in capacitor 40, the voltage supplied by battery B will be sufficient to energize the actuator 24. If a short circuit takes place across diodes 46 and 48 there may be sufficient current supplied through the short circuit from battery B to energize actuator 24 and, if not, capacitor 40 will discharge through diode 44 to provide the necessary operating current.

Still further, if an open circuit takes place at diodes 46 and 48, capacitor 40 will serve to provide sufficient operating power to energize actuator 24 since the charging resistor 42 is not affected by diode failure. If diode 44 is open circuited then the operating voltage from battery B at terminal $T_1$ will be sufficient to operate actuator 24. A short circuit at diode 44 may provide sufficient circuit continuity to carry current from capacitor 40 and this would be additive to the current supplied by battery B to operate actuator 24. If not, the battery voltage should be sufficient to operate the actuator.

Also, if a failure occurs in the charging circuit, such as an open circuit at resistor 42, then the power supplied by battery B is normally sufficient to operate actuator 24. If resistor 42 is shorted, then the capacitor 40 should operate as anticipated to fire the actuator although protection against capacitor short circuit may be lost.

The improved safety system further provides circuitry for monitoring the operating potential available at terminal $T_1$, corresponding with the sensor terminal of sensor switch 16. An abnormally low potential at this terminal, which may be caused by low battery potential or malfunctions between the battery B and terminal $T_1$, may result in there being insufficient operating potential across the output terminals $T_1$ and $T_2$ to operate actuator 24 upon closure of the sensor switch 16. The potential at terminal $T_1$ is continuously monitored and if the potential falls below a predetermined level, the warning indicator lamp 32 is energized.

The potential at terminal $T_1$ is monitored with a resistor 60 which is connected between terminals $T_1$ and $T_2$. Consequently, the voltage developed across resistor 60 corresponds with that at terminal $T_1$. The voltage developed across resistor 60 is supplied to the base of a PNP transistor 62 having its collector connected in series with lamp 32 to the negative side of battery B. The monitoring circuit is operable when the ignition switch is placed in its run position by means of a current limiting resistor 64 connected between the ignition switch and the emitter electrode of transistor 62. When the potential at terminal $T_1$ decays sufficiently, the potential applied to the base electrode of transistor 62 will become sufficiently negative to cause the transistor to become conductive. As this happens, current will flow through the emitter to collector circuit of the transistor to energize the warning lamp 32 to provide a visual indication to the vehicle operator that the operating potential across terminals $T_1$ and $T_2$ is insufficient to operate the actuator 24. Lamp 32 is preferably mounted on the vehicle dashboard at a location such that it is readily visible by the vehicle operator.

From the foregoing description it is seen that the failure warning indicator 32 is provided with circuitry for testing its operability each time the vehicle is started in response to placing the ignition switch 20 in its start position. In addition, at any time during the vehicle operation with the switch 20 in its run position, the failure warning indicator is energized if the connector 26 is improperly connected. Also, throughout the vehicle operation with the switch 20 being in its run position, the monitoring circuit continuously monitors the available voltage across terminals $T_1$ and $T_2$ and if that voltage is not sufficient then the warning indicator 32 is energized to provide a visual indication to the vehicle operator of this condition.

Although the invention has been described in conjunction with a preferred embodiment it is not limited thereto as various modifications and arrangement of parts may be made without departing from the spirit and scope of the invention as defined in the appended claims.

What is claimed is:

1. In a safety system for a vehicle having a battery and an ignition switch connected to said battery and said safety system having a safety device actuated by an electrically energizable actuator means comprising normally open sensor switch means for, when closed, completing a series circuit with said actuator means, power supply circuit means for connecting said series circuit with said ignition switch across said battery for providing a primary battery supplied voltage across said series circuit of a magnitude normally at least greater than a desired magnitude sufficient to energize said actuator means when said sensor means is closed, said power supply circuit means including a capacitor, charging circuit means for continuously subjecting said capacitor to the voltage derived from said battery to charge said capacitor to a stored voltage normally less than the magnitude of said primary voltage but at least equal to said desired magnitude, circuit means connecting said capacitor across said series circuit to define a discharge circuit including said series circuit for discharging said capacitor therethrough only when said sensor means is closed and said primary voltage is less than said stored voltage, indicator means connected to said series circuit means, and control circuit means connected to said indicator means for energizing said indicator means when the magnitude of said primary voltage decreases below that of said desired magnitude while said sensor switch means is open to provide an indication representative thereof.

2. In a safety system as set forth in claim 1, wherein said control circuit means includes circuit means connected across said series circuit for continuously developing a voltage signal representative of the magnitude of said primary voltage, said developing circuit means including semiconductor means responsive to said voltage signal for energizing said indicator means when said primary voltage decreases to a magnitude less than said desired magnitude.

3. In a safety system as set forth in claim 2, wherein said indicator means includes a lamp having a filament and circuit means for testing the electrical continuity of said filament prior to completion of initially charging said capacitor.

4. In a safety system as set forth in claim 2, including connector means for connecting said sensor switch means with said actuator means to complete said series circuit, and connector switch means having a closed condition representative that said connector means is not connected to complete said series circuit, said connector switch being connected to energize said indicator means when said connector switch means is in its closed condition.

5. In a safety system for a vehicle having a battery and a three position ignition switch connected to said battery and having an off position, a start position for starting the vehicle and a run position for normal vehicle operation and wherein said safety system employs an inflatable confinement having a collapsed condition and an expanded condition for restraining movement of a vehicle occupant during a collision comprising sensor switch means for, when closed, completing an electrical circuit with said battery through said ignition switch when in its run position for energizing actuator means for causing said confinement to be inflated to its expanded condition, a capacitor, charging circuit means for applying charging current derived from said battery through said ignition switch when in its run position to charge said capacitor to a stored voltage approaching that of the battery voltage, series circuit means connecting said capacitor with said sensor switch means for discharging said capacitor through said sensor switch means to energize said actuator means only when said sensor switch means is closed and said battery voltage is less than said stored voltage, indicator means connected to said series circuit means, and circuit monitoring means connected to said series circuit means and said indicator means for continuously monitoring said battery voltage when said ignition switch is in its run position and energizing said indicator means when the magnitude of the battery voltage decreases to a magnitude less than a predetermined magnitude.

6. In a safety system as set forth in claim 5, wherein said indicator means comprises a lamp and lamp test circuit means connected thereto and responsive to said start position of said ignition switch for testing said lamp for electrical continuity.

7. In a safety system as set forth in claim 6, wherein said lamp test circuit means includes circuit means for connecting said lamp across said battery through said ignition switch when in its start position.

8. In a safety system for a vehicle having a battery and an ignition switch connected to said battery and said safety system having a safety device actuated by an electrically energizable actuator means comprising sensor switch means for, when closed, completing a series circuit with said actuator means; power supply circuit means for connecting said series circuit with said ignition switch across said battery for providing a primary battery supplied voltage across said series circuit of a magnitude normally at least greater than a desired magnitude sufficient to energize said actuator means when said sensor means is closed, said power supply circuit means including a capacitor, charging circuit means being continuously subjected to charging voltage derived from said battery through said ignition switch to charge said capacitor to a stored voltage normally less than the magnitude of said primary voltage but at least equal to said desired magnitude, circuit means connecting said capacitor across said series circuit to define a discharge circuit including said series circuit for discharging said capacitor therethrough only when said sensor means is closed and said primary voltage is less than said stored voltage, indicator means connected to said circuit means, and circuit monitoring means connected to said circuit means for continuously monitoring at least a portion of said discharge circuit and energizing said indicator means when the magnitude of the available voltage across said portion is of a magnitude less than said desired magnitude.

9. In a vehicle having a battery, an ignition switch and a safety device which is actuatable by an electrically energizable actuator means, a circuit for effecting electrical energization of said actuator means, said circuit being connected with said battery through said ignition switch, said circuit comprising a capacitor and means for continuously subjecting said capacitor to the voltage of said battery upon closure of said ignition switch, sensor switch means connected to said capacitor and said electrically energizable actuator means for effecting discharge of said capacitor through said sensor switch means and said electrically energizable actuator means upon closing of said sensor switch means means connected to said energizing circuit permitting discharge of said capacitor only when said battery voltage decays below a predetermined value and an indicator light and switching means circuit operatively connected with said indicator light and said energizing circuit for actuating said indicator light when the voltage of the battery decays below said predetermined level.

* * * * *